United States Patent [19]
Clark et al.

[11] Patent Number: 5,359,660
[45] Date of Patent: Oct. 25, 1994

[54] LOCAL AREA NETWORK PERIPHERAL LOCK METHOD AND SYSTEM

[75] Inventors: David K. Clark, Irving; William J. Johnson, Flower Mound; Larry M. Lachman, Irving; David Flores, Keller, all of Tex.

[73] Assignee: International Business Machines Corporation, Roanoke, Tex.

[21] Appl. No.: 134,014

[22] Filed: Oct. 7, 1993

[51] Int. Cl.$^5$ ............................................. H04L 9/32
[52] U.S. Cl. ........................................ 380/25; 380/4; 380/23; 380/49; 340/825.31; 340/825.34; 340/825.5
[58] Field of Search .................... 380/4, 23, 25, 49, 50; 340/825.31, 825.34, 825.5

[56] References Cited
U.S. PATENT DOCUMENTS

| | | | |
|---|---|---|---|
| 4,780,821 | 10/1988 | Crossley | 340/825.31 X |
| 4,962,449 | 10/1990 | Schlesinger | 340/825.31 X |
| 5,276,735 | 1/1994 | Boebert et al. | 380/25 X |
| 5,287,519 | 2/1994 | Dayan et al. | 380/23 X |

OTHER PUBLICATIONS

*Security System for Personal Computers*, IBM Technical Disclosure Bulletin, vol. 30, No. 5, Oct. 1987, pp. 57–58.
*Keyboard Lock Mechanism*, IBM Technical Disclosure Bulletin, vol. 20, No. 11A, Apr. 1978, pp. 4516–4517.
*Preventing Unauthorized Access on a Personal Computer System*, IBM Technical Disclosure Bulletin, vol. 32, No. 4B, Sep. 1989, pp. 125–238.

Primary Examiner—Bernarr E. Gregory
Attorney, Agent, or Firm—Geoffrey A. Mantooth

[57] ABSTRACT

On a network, access to individual data processing systems is remotely controlled from a host data processing system. A security request is provided at the host data processing system. The security request specifies the target data processing systems, whether those systems are to be locked or unlocked, the peripherals of the specified data processing systems that are affected and a password. The security request is communicated to all data processing systems in communication with the host data processing system. Each data processing system processes the security request to determine if it is a target. If so, then a lock status of a target set of data processing systems is changed in response to the security request. The change in lock status of the target set of data processing systems either facilitates or prohibits use of the target set of data processing systems.

20 Claims, 4 Drawing Sheets

LOCAL AREA NETWORK PERIPHERAL LOCK METHOD AND SYSTEM

TECHNICAL FIELD OF THE INVENTION

The present invention relates to methods and apparatuses for securing computers and their components on a data processing system network.

Background of the Invention

It is frequently desirable to secure a large number of networked computers in order to prevent unauthorized access to both the individual computers and to the network. Current methods of securing computers involve either physically locating the computers in a secured area or individually locking each computer at the site of the computer. Reliance on the former method may be impractical. For example, a network may have workstations in several buildings scattered over many areas. Each building could have several floors, with each floor containing dozens of personal computers. The latter method relies on the individual users to lock their computers. In the prior art, there exists various devices and methods for a user to secure a computer through its keyboard. However, a user may forget to secure the user's respective computer.

Thus, there is a need for a convenient method for securing a number of networked computers. Furthermore, there is a need to secure a single computer from a remote location. This is because many facilities with computer networks have a central security location, which may be remote from the computers.

SUMMARY OF THE INVENTION

It is an object of the present invention to provide a method and a system for remotely securing a number of networked computers.

The method of the present invention remotely secures data processing systems that are located on a network. A host data processing system on the network accepts a security request targeted at a set of data processing systems connected with the host data processing system. The security request is communicated from the host data processing system to all data processing systems connected to the host data processing system on the network. The security request is recognized at the targeted set of data processing systems. A lock status of elements of the targeted set of data processing systems is then changed in response to the security request. The non-targeted systems ignore the security request.

The data processing network of the present invention controls access to individual data processing systems of the data processing network. A host data processing system is interconnected with a plurality of data processing systems which have a plurality of elements attached thereto. There is a means for accepting a security request at the host data processing system. The security request is targeted at a set of the data processing systems. There is a means for recognizing the security request at the targeted data processing systems after the security request has been communicated to all systems. In response to the security request, means for changing a lock status of elements of the target set of data processing systems change the lock status of elements of the target set of data processing systems.

The method and the system of the present invention allow security personnel to remotely control access to communicating data processing systems. Each communicating data processing system is responsive to remote commands to lock or unlock the data processing system. A locked data processing system is unresponsive to a user's commands. Only authorized personnel may change the lock status of a locked data processing system.

BRIEF DESCRIPTION OF THE DRAWINGS

FIG. 2 is a flow chart showing the method of making a security request from a host computer.

FIG. 3 is a flow chart showing the method of how a data processing workstation responds to a security request.

FIG. 4 is a flow chart of an unlocking method for unlocking a data processing workstation that has been locked in response to a security request.

DESCRIPTION OF THE INVENTION

Figure 1:
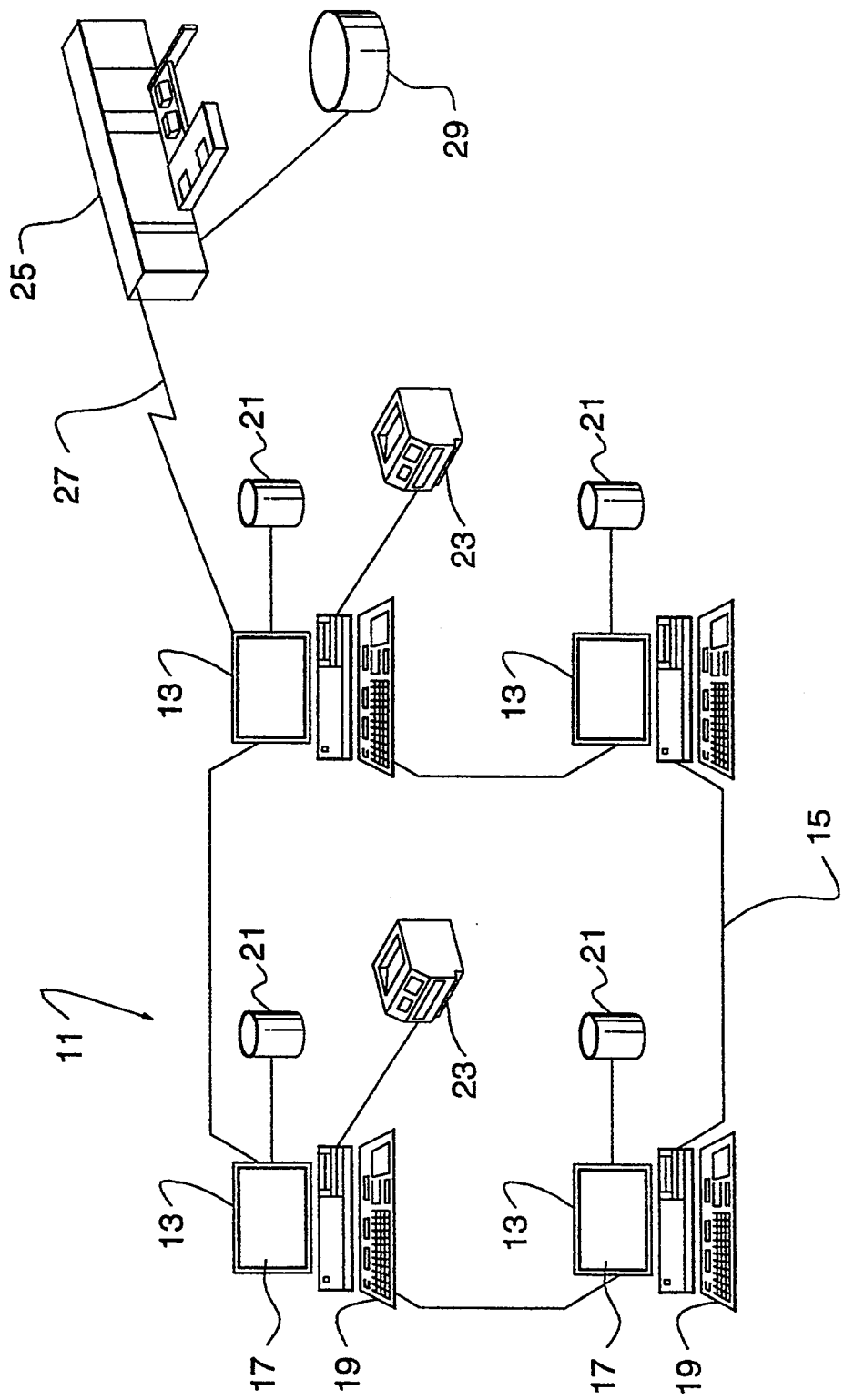
FIG. 1 is a schematic diagram of a network of data processing systems on which the present invention can be practiced.

In FIG. 1, there is shown a schematic diagram of a network 11 of plural data processing systems, upon which the present invention can be practiced. The network 11 includes plural individual data processing systems, computers or workstations 13 which are connected together in a local area network (LAN) 15. Each workstation 13 includes a user interface, which has a display screen 17 and a keyboard 19. Each workstation 13 may also be coupled to a storage device 21 and to a printer or output device 23. One or more of such storage devices 21 may be utilized, in accordance with the present invention, to store applications or resource objects which may be periodically accessed by any user within the data processing system 11.

The data processing system 11 may also include a mainframe or host computer 25 that is coupled to one of the workstations by a communication link 27. The computer 25 is also part of the network 11. The host computer 25 may also be coupled to a storage device 29 which may serve as a remote storage for the computers 13.

Figure 2:
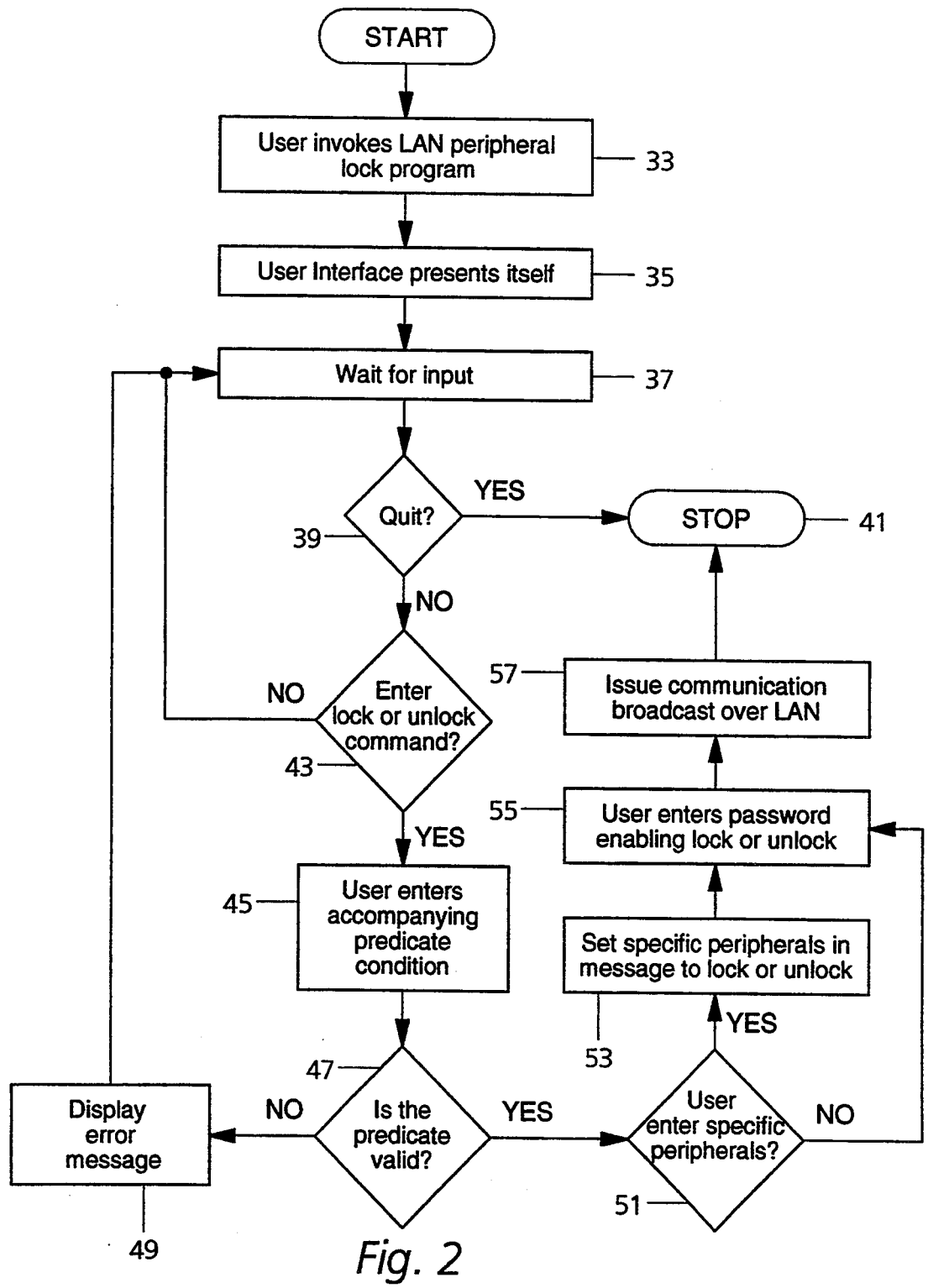
FIGS. 2–4 are flow charts showing the present invention, in accordance with a preferred embodiment.
Figure 3:
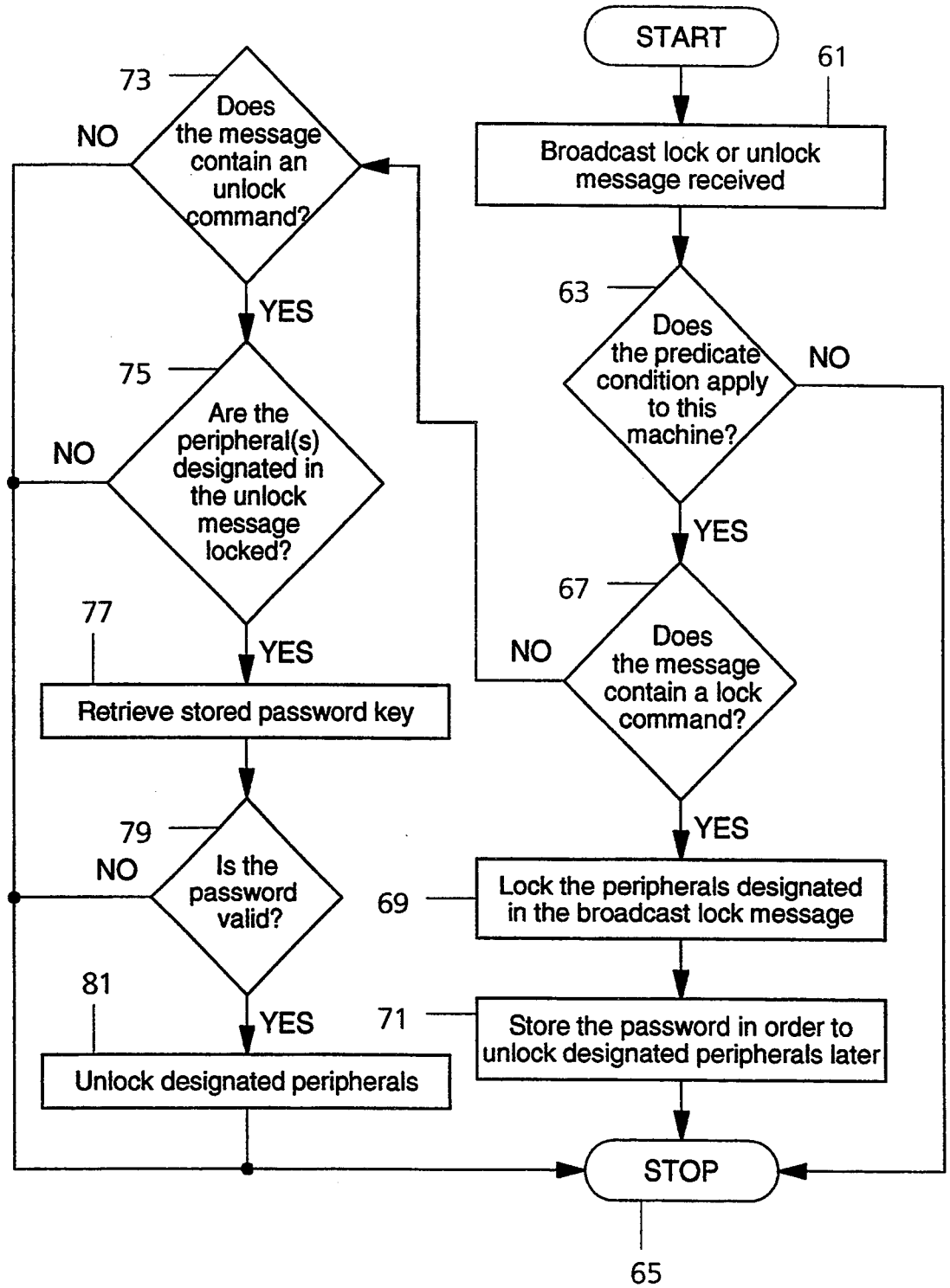
Figure 4:
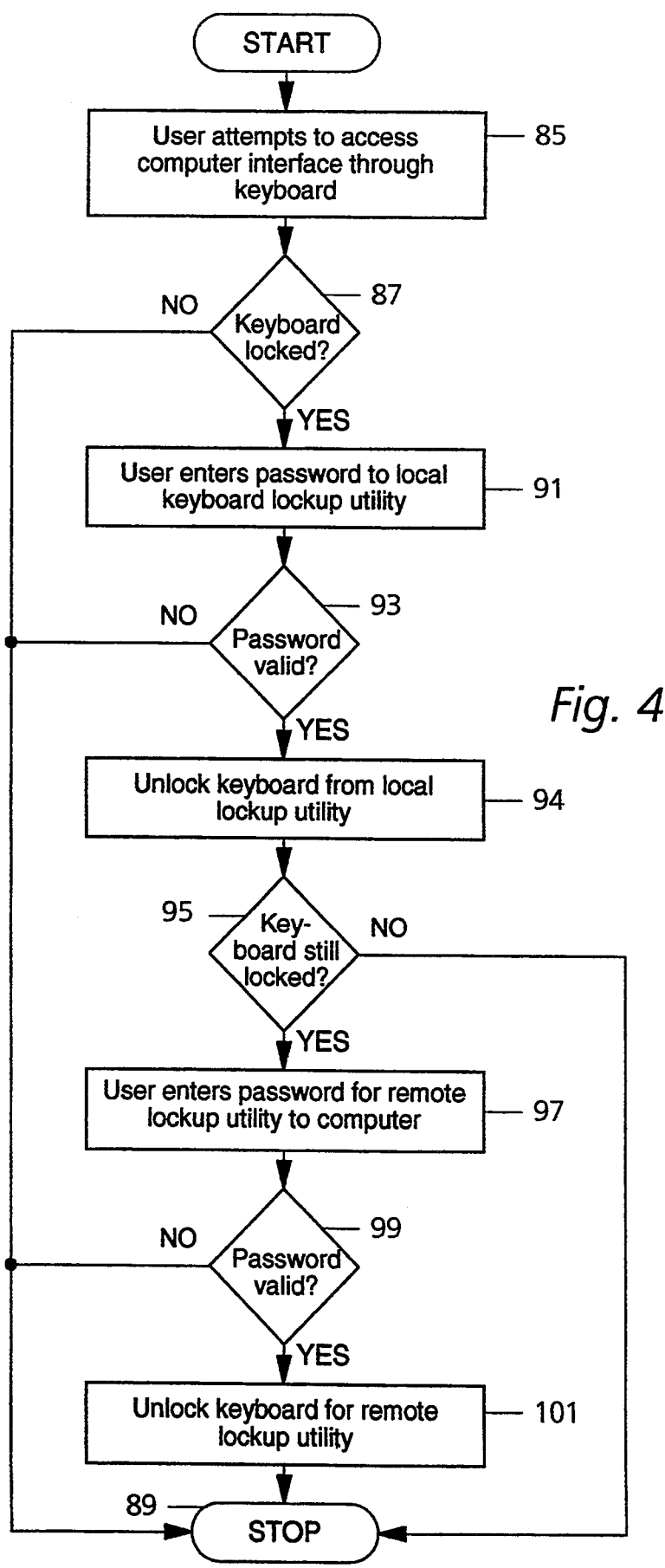

In FIGS. 2–4 are shown flow charts. In the flow charts, the following graphical conventions are observed: a rectangle for either a process, function or screen display and a diamond for a decision. These conventions are well understood by programmers skilled in the art of user interfaces and the flow charts are sufficient to enable a programmer skilled in the art to write code in any suitable computer programming language, such as BASIC, PASCAL or C for a computer such as the IBM Personal System/2 (PS/2) family of computers which supports these languages. (IBM and Personal System/2 are trademarks of International Business Machines Corporation.)

The host computer 25 may be used to implement security measures for each of the networked workstations 13. A request to lock or unlock target workstations 13 may be made from the host computer 25 by a security user, locking or unlocking the targeted workstations 13. Workstations 13 locked by the host computer 25 may be unlocked by a request to unlock made from the host computer 25 or by input of a password at the targeted workstation 13 that will unlock the lock placed on the workstation 13 by the host computer 25. The mainframe computer 25 need not serve as the host computer; one of the workstations 13 on the network 11 may serve as the host computer.

Security measures are implemented from the host computer 25 by the security request method shown in FIG. 2. The method of FIG. 2 is implemented on the host computer. A security user utilizes this method to lock or unlock targeted workstations 13 from the host computer 25. The security user could be, for example, a security guard in charge of the security of the site containing the network 15. It is preferred that only qualified personnel have access to the method of FIG. 2 in order to prevent unauthorized unlocking and entry into the network and workstations. The security user at the host computer 25 invokes the LAN peripheral lock program to initiate locking or unlocking of workstations 13, step 33. Invocation occurs by the user pressing a well known key or by providing a command. Upon invocation of the LAN peripheral lock program a user interface is presented, step 35. The user interface accepts input from the security user regarding whether workstations are to be locked or unlocked, which workstations are to be affected, what peripherals of the affected workstations are to be affected, and whether to exit the LAN peripheral lock program. After presentation of the user interface the method waits for user input, step 37.

After the security user has responded with input, the method checks to see if the input indicates whether the security user desires to quit the LAN peripheral lock program, step 39. If the result of step 39 is YES, then the method terminates, step 41.

If the result of step 39 is NO, the security user does not wish to quit the LAN peripheral lock program, then the method determines whether the security user entered either a lock or an unlock command, step 43. If the result of step 43 is NO, then the security user did not enter meaningful input to the user interface so the method loops back to step 37 and awaits user input again. The method will continue to loop back to await user input each time the security user enters input until either a command to quit is input by the security user or a lock or unlock command is given by the security user.

If the result of step 43 is YES, the security user did enter a lock or unlock command, the method then accepts a user input for a predicate condition, step 45. The predicate condition accompanies the lock or unlock command to all of the workstations of the LAN. The predicate condition input by the security user enables the security user to target a particular workstation or set of workstations 13 for the lock or unlock command. Each workstation 13 determines whether the command from the host computer 25 applies to that workstation 13 on the basis of the predicate condition.

The predicate condition input may be formed from any predicate which can be programmatically determined at a target workstation. For example, predicates such as LAN Requester Name, LAN Group Name, LAN Server Name, Token Ring Address, ALL Machines, ALL Machines with Emulators Running, Machines without Application XYZ Running, all machines that are not locally locked and Machines Running OS/2 2.0 (OS/2 is a trademark of International Business Machines Corporation) or Later Version are acceptable predicates. Furthermore, the predicates may be connected with conjunctions or disjunctions to form many levels of complex predicate conditions, thereby allowing accurate targeting of specific workstations 13 for the lock/unlock command.

After entry of the predicate condition by the security user, the method then determines if the predicate condition input by the security user is valid, step 47. If the result of step 47 is NO, the predicate condition is in error, then an error message is displayed, step 49. After displaying the error message the method loops back to await user input in step 37 again. The method will continue to loop back to await user input each time the security user enters input until a lock or unlock command with a valid predicate condition is entered or the security user quits the LAN peripheral lock program.

If the result of step 47 is YES, then a valid predicate condition was entered by the user. The method then determines whether the lock or unlock command entered by the user defines specific peripherals of the targeted workstations 13 to be locked or unlocked, step 51. For example, the security user might select to lock or unlock particular input device peripherals such as a keyboard, mouse, light pen or voice control componentry, or particular output device peripherals such as printer devices or disk drives. Any combination of peripherals connected to the targeted workstation 13 can be enabled or disabled by the command entered by the security user.

If the result of step 51 is YES, specific peripherals were selected for enablement or disablement, then the method indicates which specific peripherals were chosen by the security user to be locked or unlocked in the message to lock or unlock the target workstation 13, step 53. The method then accepts input of a password from the security user to enable the locking or unlocking of the target workstations, step 55. If the result of step 51 is NO, no specific peripherals were selected to be locked or unlocked, the method defaults to select all peripherals connected to the targeted workstation 13. The method then proceeds directly from step 51 to step 55 for input of the password to enable the locking or unlocking of the targeted workstations 13.

The password entered in step 55 allows the security user to restrict access to the targeted workstations. Only workstation users and security users having the password may unlock the targeted workstations after the workstations are locked. A password input to enable unlocking the targeted workstations, step 55, must match a previously input locking password for a security user to unlock workstations from the host computer.

After the security user enters a password enabling locking or unlocking of the targeted workstations, step 55, the host computer 25 issues a communication broadcast over the LAN 15, step 57. The communications broadcast includes the lock or unlock command entered in step 37, the predicate condition entered in step 45, instructions regarding which peripherals of target workstations are to be affected entered in step 53, and the password entered in step 55 which password enables locking or unlocking of the target workstations. The communication broadcast is transmitted to the workstations 13 from the host computer 25 through the communications link 27 of the LAN. The communications broadcast is formatted corresponding to the communications protocol of the LAN. The communications broadcast may be encrypted as a code to ensure that emulating the communications broadcast is difficult.

In the preferred embodiment, the LAN 15 is a token ring LAN using Network Basic Input/Output Systems (NETBIOS). Also, Advanced Program-to-Program Communication (APPC), Transmission Control Protocol/Internet Protocol (TCP/IP) and other network protocols could be used to communicate over the network. Implementation can be isolated from a specific environment architecture by using a standard network service or mail service.

Each workstation 13 connected to the LAN 15 receives the communications broadcast, whether or not the particular workstation is targeted for a lock/unlock command. Each individual workstation determines from the predicate condition of the lock/unlock message whether the command applies to it. After issuing the communications broadcast, the security request method of FIG. 2 is terminated, step 41.

The workstations 13 respond to the communications broadcast by entering the workstation response method shown in FIG. 3. The workstation response method is initiated by receipt of a communications broadcast from the host computer 25, step 61. The method of FIG. 3 is implemented as a terminate and stay resident program (TSR) on each workstation. The TSR is loaded because it is either part of an operating system kernel or because it is part of the operating system startup program execution. The TSR is installed on the workstation at or directly after boot time. The workstation 13 programmatically determines from the message whether the predicate condition of the communications broadcast includes the workstation 13, step 63. The predicate may include a check to see that a local lock is not currently in place. If the result of step 63 is NO, then the lock/unlock message does not apply to the workstation, and the method terminates, step 65.

If the result of step 63 is YES, then the workstation is included in the set of workstations targeted for the lock or unlock command issued by the host computer 25. The method then determines whether the broadcast message contains a lock command, step 67. If the result of step 67 is YES, then the workstation 13 is to be locked by the command from the host computer 25. Each peripheral of the workstation designated to be locked is locked to prevent further use, step 69. (Locking or security programs are well known in the art. One example is a locking program for a keyboard that steals an interrupt from the keyboard. When the locking program is invoked, any input from the locked keyboard is directed to the locking program. Unauthorized inputs are effectively ignored. When the password is entered through the keyboard, the locking program for the keyboard recognizes the password and unlocks the keyboard by releasing the keyboard interrupt.) The password received in the communications broadcast is then stored in the workstation's memory to enable the designated peripherals to be unlocked at a later time upon entry of the same password into the workstation, step 71. The workstation response method is then terminated, step 65.

If the broadcast message does not contain a lock command, then the result of step 67 is NO, and the method subsequently determines if the message from the host computer contains an unlock command, step 73. If the result of step 73 is NO, then neither a lock nor an unlock command was issued in the broadcast message and the method terminates, step 65.

If the result of step 73 is YES, then an unlock command was issued in the message and the workstation 13 is to be remotely unlocked from the host computer 25. The method determines whether all of the peripherals designated in the unlock message are locked on the workstation, step 75. If the result of step 75 is NO, then the unlock message does not apply and the method terminates, step 65. Such a situation could arise when, for example, a workstation user has already unlocked the workstation at the situs of the workstation. This situation will be discussed hereinafter, with reference to FIG. 4.

If the result of step 75 is YES, then the unlock message specifically applies to at least some locked peripherals of the workstation. In step 77, the method retrieves the password key previously stored in step 71. The method then determines whether the password key entered by the security user in the broadcast message is valid, step 79. The validity of the password key entered by the security user is determined by comparing the entered password key with the retrieved password key to see if the passwords match. If the result of step 79 is NO, the entered password key is invalid, then the method is terminated, step 65, leaving the workstation locked. If the result of step 79 is YES, the entered password key is valid, then the designated peripherals are unlocked, step 81. The method is then terminated, step 65, leaving the workstation in an unlocked condition.

If it is desired, the workstation may be unlocked at the situs of the workstation as well as by the host computer. FIG. 4 shows an example of a workstation unlocking method that allows a workstation user to unlock a workstation with a locked keyboard. The workstation may be subject to two locks, the remote lock imposed on the workstation by the host computer 25 as described above, and a local lock imposed on the workstation by a workstation user. If the local and remote locks are enabled, the workstation user must disable both locks before the user is allowed access to an unlocked workstation. The local lock is disabled by the workstation user entering a local password for a local lockup utility that is resident on the user's workstation, such as a keyboard lockup utility. The remote lock is disabled by the workstation user entering a password for the remote lockup utility.

The method of FIG. 4 is executed as a TSR upon a workstation user's attempt to gain access to the workstation, step 85. Although the keyboard may be locked to prohibit unrestricted access to the workstation, the keyboard still accepts limited input relating to password entry from a workstation user attempting to access the workstation computer interface. The method determines whether the keyboard is locked, step 87. If the result of step 87 is NO, neither the remote lock nor the local lock is enabled and the method terminates, step 89, allowing the user unrestricted access to the workstation.

If the result of step 87 is YES, then at least one of the locks is enabled. The workstation user then enters the local password to the local keyboard lockup utility in order to disable the local lock, step 91. The method then determines if the entered local password is valid, step 93. If the result of step 93 is NO, then the method terminates, step 89, and the keyboard remains locked.

If the result of step 93 is YES, the local remote password is valid, then the keyboard is unlocked from the local lockup utility, step 94. The local keyboard lockup utility indicates that the local keyboard lock has been disengaged. This can be by providing a message to the user. The method then determines if the keyboard is still locked by the remote lock, step 95. If the result of step 95 is NO, then the workstation user has unrestricted access to the workstation 13. The method then terminates, step 89.

If the result of step 95 is YES, then the keyboard is locked by the remote lock. The remote lock must be disabled before the workstation user may use the workstation. The workstation user enters a password to the computer to disable the remote lock, step 97. The method then determines whether the entered password is valid by comparing the entered password with the remote password, step 99. The remote password may be either the same or a different password than the password used in steps 77 and 79. If the remote password is different, it is communicated to the workstation by the communication broadcast. If the entered password does not match the remote password, then the entered password is invalid and the result of step 99 is NO. The method then terminates, step 89, leaving the keyboard locked. If the result of step 99 is YES, the entered password matches the remote password, and the method unlocks the keyboard, step 101. The method then terminates, step 89, allowing the user unrestricted access to the workstation. With unrestricted access, the user is free to use the keyboard in any manner. Describing how the user uses the keyboard goes beyond the scope of this invention.

The workstation unlocking method of FIG. 4 may be modified to remove the necessity for entering a local password if the local lock is not enabled. A step may be introduced to determine which lock is enabled, the remote lock, the local lock, or both, after determining that the keyboard is locked. If only the local lock is enabled, or both the local lock and the remote lock are enabled, then the workstation user is required to enter the local password. However, if only the remote lock is enabled then the workstation user need only enter the remote password in order to unlock the workstation, and the steps involving entering and checking the validity of a local password may be bypassed.

The workstation unlocking method of FIG. 4 may also be modified to prevent a workstation user from unlocking the workstation if the remote lock is enabled. Tight security may be imposed on the workstations by permitting only security users at the host computer to disable a remote lock imposed on the workstations from the host computer. In order to impose this security, the method may test to see if the workstation is subject to a remote lock after determining that the workstation is locked. If a remote lock is in place, the method may display a message to a workstation user indicating that the workstation is remotely locked and may not be accessed until the remote lock is removed by a security user. The method may then terminate, leaving the workstation locked. If the workstation is only locally locked, then the method may allow the entry of a local password to disable the local lock and allow the workstation user unrestricted access to the workstation.

Referring now to FIG. 2, an example of changing the lock status of the workstations will be discussed. A security user initiates the LAN peripheral lock program at the host computer. The security user must initially enter a lock, unlock, or quit command, step 37. Entry of a different type command causes the method to respond by waiting for correct input. If the security user enters a quit command, the method terminates.

If, however, the security user enters a lock or unlock command, a predicate condition specifying the workstations upon which the command is to operate is then entered, step 45. For example, if the command is to operate on every workstation, the security user would enter a predicate condition such as "ALL Machines".

The predicate condition may also include specific peripherals that the command is to operate upon, for example, the workstation keyboard. Failure to enter a valid predicate causes the method to display an error message indicating that the predicate was invalid. After the error message is displayed, the security user must enter a lock, unlock, or quit command as described above.

Once a valid predicate has been entered, the security user must enter a password, step 55, that will enable the remote locking or unlocking of the workstations targeted in the predicate condition. When locking a remote workstation, the password entered by the security user will be the remote password required to unlock the remote lock. When unlocking a remote workstation, the password entered by the security user must match the password stored during enablement of the remote lock in order to unlock the remote lock. After the security user enters the password, the communication broadcast is issued over the LAN, and the method completes the desired locking or unlocking of the target workstations and the desired peripherals.

The foregoing disclosure and the showings made in the drawings are merely illustrative of the principles of this invention and are not to be interpreted in a limiting sense.

What we claim is:

1. A method of remotely securing a network of plural data processing systems, with each data processing system comprising one or more lockable elements, said plural data processing systems being connected to a host data processing system by said network, comprising the steps of:

a) providing each or said elements of each of said data processing systems in said network with a lock status, wherein said lock status may be changed between an unlocked condition and a locked condition, Wherein each of said elements having said lock status in said unlocked condition is accessible for use and each of said elements having said lock status in said locked condition is inaccessible for use;

b) at a host data processing system, accepting a security request targeted at a target set of said data processing systems, said security request being an instruction to change said lock status of at least one of said elements of each of said data processing systems in said target set of said data processing systems;

c) communicating said security request from said host data processing system to all of said interconnected data processing systems on said network;

d) recognizing said security request at said target set of said data processing systems; and e) changing said lock status of at least one of said elements of each of said data processing systems in said target set of said data processing systems in response to said recognized security request.

2. The method of claim 1, wherein said step of accepting a security request further comprises the step of accepting an instruction to place said lock status of at least one of said elements of each of said data processing systems in said target set of said data processing systems in said locked condition to prevent access to said target data processing systems.

3. The method of claim 1, wherein said step of accepting a security request further comprises the step of accepting an instruction to place said lock status of at least one of said elements of each of said data processing systems in said target set of said data processing systems in said unlocked condition to allow access to said target data processing systems.

4. The method of claim 1, wherein:
   a) said step of accepting a security request further comprises the step of accepting a password; and
   b) said step of recognizing said security request further comprises the step of recognizing said password.

5. The method of claim 1, wherein said step of accepting a security request further comprises the step of accepting a target set of elements to be targeted on each of said data processing systems of said target set of said data processing systems.

6. The method of claim 5, wherein said step of changing said lock status of at least one of said elements of said data processing systems in said target set of said data processing systems in response to said recognized security request further comprises the step of changing said lock status of said target set of elements on each of said data processing systems of said target set of data processing systems.

7. The method of claim 1, wherein said step of accepting a security request further comprises the step of accepting a predicate, where said predicate specifies which data processing systems in said network of plural data processing systems are included in said target set of said data processing systems.

8. The method of claim 1, wherein said step of recognizing said security request further comprises the step of determining whether each of said data processing systems interconnected with said host data processing system is included within said target set of said data processing systems.

9. The method of claim 1, further comprising the steps of accepting and recognizing a second request entered at one of said data processing systems of said target set of said data processing systems to place the lock status of said one of said data processing systems in said unlocked condition.

10. The method of claim 1 wherein said step of changing said lock status of at least one of said elements of said data processing systems in said target set of said data processing Systems in response to said recognized security request further comprises the step of changing said lock status of a keyboard of each of said data processing systems in said target set of said data processing systems.

11. A data processing network, comprising:
   a) a host data processing system;
   b) a plurality of data processing systems interconnected with said host data processing system, each of said data processing systems having one or more lockable elements attached thereto;
   c) means for providing each of said elements of each of said data processing systems with a lock status, wherein said lock status may be changed between an unlocked condition and a locked condition, wherein each of said elements having said lock status in said unlocked condition may be accessed and each of said elements having said lock status in said locked condition may not be accessed;
   d) means for accepting a security request at said host data processing system, said security request being targeted at a target set of said data processing systems, said security request being an instruction to change said lock status of at least one of said elements of each of said data processing systems in said target set of said data processing systems;
   e) means for recognizing said security request at said target set of said data processing systems after said security request has been communicated over said network; and
   f) means for changing said lock status of at least one of said elements of each of said data processing systems in said target set of said data processing systems in response to said recognized security request.

12. The network of claim 11, wherein said means for accepting a security request further comprises means for accepting an instruction to place said lock status of at least one of said elements of each of said data processing systems in said locked condition to prevent access to said elements of said target data processing systems.

13. The network of claim 11, wherein said means for accepting a security request further comprises means for accepting an instruction to place said lock status of at least one of said elements of each of said data processing systems in said target set of said data processing systems in said unlocked condition to allow access to said elements of said target data processing systems.

14. The network of claim 11, wherein:
   a) said means for accepting a security request further comprises means for accepting a password; and
   b) said means for recognizing said security request further comprising means for recognizing said password.

15. The network of claim 11, wherein said means for accepting a security request further comprises means for accepting a target set of elements to be targeted on each of said data processing systems of said target set of said data processing systems.

16. The network of claim 15, wherein said means for changing said lock status of at least one of said elements of said data processing systems in said target set of said data processing systems in response to said recognized security request further comprises means for changing said lock status of said target set of elements on each of said data processing systems of said target set of data processing systems.

17. The network of claim 11, wherein said means for accepting a security request further comprises means for accepting a predicate, where said predicate specifies which data processing systems in said network of plural data processing systems are included in said target set of said data processing systems.

18. The network of claim 11, wherein said means for recognizing a security request further comprises means for determining whether each Of said data processing systems interconnected with said host data processing system is included within said target set of said data processing systems.

19. The network of claim 11, further comprising means for accepting and recognizing a second request entered at one of said data processing systems of said target set of said data processing systems to place the lock status of said one of said data processing systems in said unlocked condition.

20. The network of claim 11 wherein said means for changing said lock status of at least one of said elements of said data processing systems in said target set of said data processing systems in response to said recognized security request further comprises means for changing said lock status of a keyboard of each of said target data processing systems.

* * * * *